US008057658B2

(12) United States Patent
Fray et al.

(10) Patent No.: US 8,057,658 B2
(45) Date of Patent: Nov. 15, 2011

(54) ELECTROCHEMICAL METHOD, APPARATUS AND CARBON PRODUCT

(75) Inventors: Derek John Fray, Cambridge (GB); Carsten Schwandt, Cambridge (GB); Aleksandar Dimitrov, Skopje (MK)

(73) Assignee: Cambridge Enterprise Limited The Old Schools, Cambridge (GB)

( * ) Notice: Subject to any disclaimer, the term of this patent is extended or adjusted under 35 U.S.C. 154(b) by 888 days.

(21) Appl. No.: 11/664,576

(22) PCT Filed: Sep. 28, 2005

(86) PCT No.: PCT/GB2005/003731
§ 371 (c)(1),
(2), (4) Date: Dec. 14, 2007

(87) PCT Pub. No.: WO2006/037955
PCT Pub. Date: Apr. 13, 2006

(65) Prior Publication Data
US 2008/0105561 A1 May 8, 2008

(30) Foreign Application Priority Data

Oct. 1, 2004 (GB) .................................. 0421869.9
May 27, 2005 (GB) .................................. 0510954.1

(51) Int. Cl.
C25B 1/00 (2006.01)
(52) U.S. Cl. ...................................................... 205/354
(58) Field of Classification Search .................. 205/354
See application file for complete search history.

(56) References Cited

FOREIGN PATENT DOCUMENTS

| CN | 1378975 | 11/2002 |
|----|---------|---------|
| CN | 1579932 | 2/2005 |

OTHER PUBLICATIONS

Dimitrov et al., "A Feasibility Study of Scaling-Up the Electrolytic Production of Carbon Nanotubes in Molten Salts", Electrochimica Acta (no month, 2002), vol. 48, pp. 91-102.*
Xu et al., "Electrochemical Investigation of Lithium Intercalation into Graphite from Molten Lithium Chloride", J. of Electroanal. Chem. (no month, 2002), vol. 530, pp. 16-22.*
Bai et al., "Synthesis of SWNTs and MWNTs by Molten Salt (NaCl) Method", Chem. Phys. Lett. (no month, 2002), vol. 365, pp. 184-188.*
Q. Xu et al., "Electromechanical Investigation of Lithium Intercalation into Graphite from Molten Lithium Chloride", J. Electroanal. Chem., vol. 530, 2002, pp. 16-22.
Dimitrov A. et al., "A feasibility Study of Scaling-Up the Electrolytic Production of Carbon Nanotubes in Molten Salts", Electrochimica ACTA, Elsevier Science Publishers, Barking, GB, vol. 48, No. 1, Nov. 4, 2002, pp. 91-102.
Kinloch I A et al., "Electrolytic, TEM and Raman Studies on the Production of Carbon Nanotubes in Molten NaCl", Carbon, vo. 41, No. 6, 2003 pp. 1127-1141.

* cited by examiner

Primary Examiner — Edna Wong
(74) Attorney, Agent, or Firm — John B. Hardaway, III; Nexsen Pruet, LLC

(57) ABSTRACT

In an electrolytic method for producing nano-scale carbon products, such as carbon nanotubes, first and second graphite electrodes contact a fused-salt electrolyte. A power supply is coupled to the electrodes and first and second voltages are alternately applied to the electrodes. The first voltage is applied such that the first electrode is at a cathodic potential relative to the second electrode, and the second voltage is applied such that the second electrode is at a cathodic potential relative to the first electrode. The method thus advantageously converts the carbon of both electrodes to nano-scale carbon products.

12 Claims, 3 Drawing Sheets

ELECTROCHEMICAL METHOD, APPARATUS AND CARBON PRODUCT

The invention relates to an electrochemical method, apparatus and product, and in particular to a method and an apparatus for the production of nano-scale carbon products, such as nanotubes, nanowires, fibres and/or particles, and to nano-scale carbon products produced thereby.

Carbon nanotubes are endowed with a unique combination of physical and chemical properties. They possess excellent mechanical strength and stiffness, they have good thermal conductivity, their electronic conductivity may range between those of metals and semiconductors of moderate band gap, they provide remarkable chemical stability, and they may serve as the host material for chemically-stored hydrogen or lithium. Consequently, carbon nanotubes suggest themselves for numerous applications in various areas. However, carbon nanotubes will only become more widely employed if their production is made possible in large quantity and at an affordable price. Although much interest has to date focussed on carbon nanotubes, other nano-scale carbon products such as nanowires, nanofibres and nanoparticles may similarly provide unusual and useful physical and chemical properties.

The main hitherto-utilised production methods of carbon nanotubes are the following. In the arc-evaporation technique, an electric arc is struck across a narrow and helium-filled gap between two graphite electrodes, whereby carbon evaporates from the anode and condenses on the cathode, partly in the form of carbon nanotubes. Laser beam or electron beam techniques include the evaporisation of graphite and the condensation of the volatised material on a cooled substrate. Pyrolytic methods are based on thermal decomposition of organic compounds like benzene in the presence of hydrogen and condensation of the reaction product. In catalytic methods, carbon-containing gases are decomposed in the presence of both a metal-based catalyst and hydrogen, and the products are collected on a substrate.

Each of the aforementioned techniques suffers from one or more of the following disadvantages: they are expensive and require sophisticated equipment as well as highly skilled operators; throughput, yield and selectivity are poor; they are hazardous in nature; and upscaling is complicated.

Insufficient purity of the raw material produced poses a particular problem, as the separation of carbon nanotubes from other carbon-based materials is difficult and inefficient. A commonly-applied type of post-treatment, for instance, relies on the oxidation of reaction products comprising different forms of carbon with sulphuric acid, which oxidises graphite more readily than carbon nanotubes, but the method is rather unspecific and further lowers the overall yield.

Consequent of the above issues, the price of carbon nanotubes is excessively high at present and has thus far prevented wider utilisation of this material.

In recent years, a molten-salt electrochemical technique has been developed. In this, an electrochemical cell is employed that comprises a graphite cathode, a graphite anode, and a molten-salt electrolyte, typically of sodium chloride. It is thought that the mechanism of the process is as follows. The cell is polarised such that intercalation of the alkali metal species from the molten salt (sodium) into the graphite cathode occurs, while chlorine gas is released at the anode. The intercalation is followed by a complex sequence of reaction steps which lead to the destabilisation of the graphite and the generation of nanosized carbon-based material, which becomes detached from the cathode and assembles in the molten salt. In one such proposed mechanism, the alkali metal atoms are inserted into the graphite structure and squeeze out planes of graphite which roll up into nanotubes; the nanotubes remain suspended in the salt. After cooling, the carbonaceous product is washed out of the solidified salt with water and recovered through organic-solvent extraction, which relies on collecting the material produced at a toluene/water interface.

The method offers an additional advantage in that metal-filled carbon nanotubes, occasionally termed nanowires, may be produced in situ. This is achieved by carrying out the electrolysis in the presence of small amounts of metal chlorides, dissolved in the molten salt, that contain easily-reducible cations, like $SnCl_2$, $PbCl_2$ or $BiCl_3$, and results in nano-sized products that encapsulate, at least partly, the respective metal.

The molten-salt electrochemical production method is relatively simple and clearly the least expensive of the available nanotube production methods, and also has the potential for upscaling.

Further information regarding known procedures for molten-salt electrochemical production of carbon nanotubes is given in "Electrolytic, TEM and Raman studies on the production of carbon nanotubes in molten NaCl", by Kinloch, Chen, Howes, Boothroyd, Singh, Fray and Windle, in Carbon 41, pp. 1127-1141. This publication is incorporated herein by reference in its entirety.

Other prior art references, incorporated herein by reference in their entirety, are as follows:

1. G. Z. Chen, X. Fan, A. Luget, S. P. Schaffer, D. J. Fray and A. H. Windle, "Electrolytic Conversion of Graphite to Carbon Nanotubes in Fused Salts", *J. Electroanalytical Chemistry* 446 (1998) 1-6.
2. D. J. Fray, "Intercalation from Molten Salts", *High Temperature Material Processes*, 3 (1999) 67-76.
   and the corresponding publication:
   D. J. Fray, "Intercalation from Molten Salts", *Molten Salts Bulletin* 66 (1999) 2-11.
3. G. Z. Chen, I. Kinloch, M. S. P. Shaffer, D. J. Fray, A. H. Windle, "Electrochemical investigation of the formation of carbon nanotubes in molten salts", *High Temperature Material Processes*, 2 (1998) 459-469.
   and the corresponding publication:
   G. Z. Chen, I. Kinloch, M. S. P. Shaffer, D. J. Fray, A. H. Windle, "Electrochemical investigation of the formation of carbon nanotubes in molten salts" in *Advances in Molten Salts*, Ed M Gaune-Escard (begell house, inc. New York 1998) p 97-107.
4. G. Z. Chen and D. J. Fray, "Novel cathodic processes in molten salts", 6th *International Symposium on Molten Salt Chemistry and Technology*, Eds. C Nianyi and Q. Zhiyu (Shanghai University Press, 2001) 79-85 (2001).
5. Q. Xu, C. Schwandt, G. Z. Chen, D. J. Fray, "Electrochemical investigation of lithium intercalation into graphite from molten lithium chloride", *Journal of Electroanalytical Chemistry* 530 16-22 (2002).
6. A. T. Dimitrov, G. Z. Chen, I. A. Kinloch and D. J. Fray, "A feasibility study of scaling-up the electrolytic production of carbon nanotubes in molten salts", *Electrochimica Acta* 48 91-102 (2002).

The main drawback of the conventional molten-salt electrochemical technique is the relatively poor quality of the carbonaceous product and, more specifically, the low yield of nanotubes that has to date been achieved. In addition, yield of nanotubes in conventional methods falls rapidly with time. Following the known procedures typically yields a carbonaceous product that is an intimate mixture of carbon nanotubes and other species or products, i.e. other forms of carbon.

In fact, the nanotubes usually constitute a minor fraction of the product, with typical contents ranging from 0 to 30%. The additional products may be divided into two classes, and these are, firstly, other nanosized carbon materials like particles and fibres that are thought to form through similar electrochemical reactions as those leading to nanotubes and, secondly, comparatively large pieces of graphite that are thought to become detached from the cathode during the process without having reacted with the salt to a significant degree.

A further disadvantage is that in cells using chloride electrolytes, chlorine is evolved at the anode.

SUMMARY OF THE INVENTION

The invention provides in its various aspects a method and an apparatus for producing nano-scale carbon products, and a nano-scale carbon product, as defined in the appended independent claims. Preferred or advantageous features of the invention are defined in dependent sub-claims.

Thus, in a first aspect the invention may advantageously provide a method for producing nano-scale carbon products, and preferably for producing carbon nanotubes (which are thought to be the most desirable such products for many applications), in which first and second graphite electrodes are contacted with, or immersed in, a fused-salt electrolyte. A voltage source or power supply is coupled to the electrodes so as alternately to apply to the electrodes a first voltage such that the first electrode is at a cathodic potential relative to the second electrode, and a second voltage such that the second electrode is at a cathodic potential relative to the first electrode.

Nano-scale carbon products may thus be alternately produced at the first and second electrodes. This may advantageously address the problem observed in the prior art, that when a cathodic potential is continuously applied to a graphite electrode in contact with a fused salt for carbon nanotube production, the rate of nanotube production falls over time.

In a preferred embodiment, the method and apparatus are preferably substantially symmetrical so that, for example, the first and second electrodes are of similar shape and/or size, and the first and second voltages are of substantially equal magnitude.

Preferably, the first and second voltages are applied alternately within half-cycles of between about 30 seconds and 5 minutes. The applied voltage may switch rapidly between the half-cycles, such that the applied potential at each electrode is applied substantially in the form of a square wave, or the applied voltage may be switched more slowly. In the latter case, the first and second voltages may not be applied for the entire duration of each half-cycle but may be applied, for example, for about 25%, about 50% or about 75% of each half-cycle.

The first and second voltages applied during each half-cycle may not be constant, and so may vary or may be modulated. The first and second voltages should, however, be such that nano-scale carbon products are produced in alternate half-cycles at the first and second electrodes respectively.

The fused-salt electrolyte preferably comprises a halide of an alkali metal. Advantageously, the fused-salt electrolyte comprises Li or Na and particularly preferably it comprises LiCl.

This method may, according to the tentative mechanism described above, thus insert alkali metal from the electrolyte into the graphite at the cathode and produce carbon nanotubes, and (in the first half-cycle) evolve chlorine at the anode.

The flowing of current is then reversed so that the cathode now becomes the anode. The alkali metal ionises, leaves the anode (formerly the cathode) and is inserted into the cathode, producing more nanotubes but advantageously little or no chlorine as the anodic reaction is now the ionisation of the alkali metal. This recycling of the alkali metal may go on indefinitely until all the graphite electrodes are consumed in producing carbon nanotubes and nanoparticles. This may advantageously improve the current efficiency of the process, and may achieve around 80% current efficiency.

The economics of the process appear to be very attractive in that carbon nanotubes, at present, cost more than \$10/g. Graphite costs about \$0.001/g and the electricity costs are minimal. In theory, it may therefore be possible to reduce substantially the cost of production to well below \$0.01/g by using this simple process.

A second aspect of the invention provides a method for producing nano-scale carbon products, such as nanotubes, in which a graphite electrode, or cathode, and an anode contact a fused-salt electrolyte comprising Li ions, or comprising LiCl, and a voltage is applied between the cathode and the anode so as to generate a cathode current density of between about $1.5\,A\cdot cm^{-2}$ and $2.5\,A\cdot cm^{-2}$ and preferably of about $2.0\,A\cdot cm^{-2}$. These preferred current densities have been found to enhance carbon nanotube yield. The cathode current density depends on the surface area of the cathode as well as the applied cell voltage, and so it may be advantageous to use a cathode of large surface area in order increase the rate of carbon nanotube production (which is expected to be related to the total cell current) while applying a cathode current density in the preferred range described above in order to improve carbon nanotube yield.

Since the graphite cathode is consumed during nanotube production, and therefore its surface area exposed to the electrolyte may change, it may be desirable to vary the applied cell voltage during nanotube production in order to retain the cathode current density within the desired range.

This aspect of the invention may advantageously be combined with the first aspect described above, in which first and second graphite electrodes are used alternately as the cathode. In that case, the first and second voltages may be selected so as to generate cathode current densities within the preferred range.

This and other aspects of the invention relate to an electrolyte comprising Li ions or comprising LiCl. In these aspects the electrolyte may, for example, comprise mixtures of salts but the Li ions or LiCl should be present in sufficient concentration that the electrolyte performs in substantially the same way as an electrolyte of pure LiCl or an electrolyte containing no cations other than Li cations.

A third aspect of the invention provides a method in which a graphite electrode, or cathode, an anode and a reference electrode contact a fused-salt electrolyte, and the voltage applied between the cathode and the anode is controlled in response to a voltage or potential measured between the reference electrode and either the cathode or the anode. This method may effectively control the overpotential at the cathode. The reference electrode may be a pseudo-reference electrode, such as a molybdenum electrode contacting the electrolyte.

In a preferred embodiment, the fused-salt electrolyte comprises LiCl, the reference electrode is a molybdenum pseudo-reference electrode and the cell voltage is controlled so that the cathodic potential is between about 2.0 V and 3.0 V, and particularly preferably about 2.5 V, measured with reference to the molybdenum pseudo-reference electrode.

Controlling the cathode potential has been found by the inventors to enhance carbon nanotube yield, particularly in the preferred embodiment described above.

It is not essential to use molybdenum as a reference-electrode material. Other materials may be used and it would be within the competence of the skilled person to select a suitable material which is suitably inert when contacted with the fused-salt electrolyte. If a different material is used, then the reference potential may be different from that of a molybdenum pseudo-reference electrode and therefore the preferred voltage range measured between the cathode and the reference electrode in an electrolyte comprising LiCl would be offset from the range of about 2.0 V to 3.0 V, or the preferred voltage of 2.5 V, described above. However, it would be within the competence of the skilled person to convert the preferred voltages described above for a different reference-electrode material, by taking into account the potential offset between the reference-electrode materials. Similarly for different electrolyte materials and compositions combined with different reference electrodes, the reference potential measurement would be offset and the skilled person would be able to take the offset into account.

This aspect of the invention may advantageously be combined with the first and/or second aspects described above so that, for example, the first and second voltages described in the first aspect are within a preferred range as described in the third aspect.

A fourth aspect of the invention provides a method for producing nano-scale carbon products, such as nanotubes, in which a graphite electrode, or cathode, and an anode contact a fused-salt electrolyte comprising LiCl, and the electrolyte temperature is preferably either between about 620 C and 700 C or between about 750 C and 800 C, or particularly preferably between about 770 C and 780 C.

Surprisingly, the inventors have therefore found two distinct temperature ranges in which nanotube production in an electrolyte comprising LiCl may be enhanced. The intermediate temperature range, between about 700 C and 750 C, disadvantageously produces a reduced nanotube yield.

This aspect of the invention may advantageously be combined with one or more of the various aspects described above so that, for example, a method in which first and second graphite electrodes contact a fused-salt electrolyte may advantageously operate within a preferred temperature range as described.

A fifth aspect of the invention provides a method for producing nano-scale carbon products, such as nanotubes, in which a graphite electrode, or cathode, and an anode contact a fused-salt electrolyte, and in which the graphite cathode is of low-density graphite or is of soft graphite. The inventors have found that low-density, or soft, graphite may advantageously enhance the carbon nanotube yield. The density is preferably less than 1.80 g/cm$^3$ and particularly preferably less than or equal to about 1.75 g/cm$^3$.

The fused-salt electrolyte preferably comprises a halide of an alkali metal. Advantageously, the fused-salt electrolyte comprises Li or Na and particularly preferably it comprises LiCl.

This aspect of the invention may advantageously be combined with one or more of the other aspects described above. For example, in a method comprising contacting a fused-salt with first and second graphite electrodes, both electrodes may advantageously comprise low-density or soft graphite.

The density and/or hardness of graphite may be related to its grain size, and in a further aspect of the invention a suitable graphite electrode material may be selected according to its grain size. Thus, the average grain size of a graphite electrode for use as a cathode material in the fabrication of nano-scale carbon products, such as nanotubes, should be greater than 5 micrometres, preferably greater than 15 micrometres and particularly preferably greater than 30 micrometres.

In each aspect of the invention described above in which a fused-salt electrolyte may be contacted with a graphite cathode and an anode of a different material (i.e. in aspects other than the first, in which both electrodes are of graphite), the anode may advantageously comprise a material which is substantially inert to the electrolyte.

The invention may further advantageously provide apparatus for implementing each of the methods described above. In a preferred embodiment this includes an apparatus for producing nano-scale carbon products, such as nanotubes, comprising a receptacle or container for a fused-salt electrolyte, first and second graphite electrodes for contacting, or for immersion in, the electrolyte, and a controllable power supply coupleable to the electrodes. The power supply is controllable alternately to apply to the electrodes a first voltage such that the first electrode is at a cathodic potential relative to the second electrode, and a second voltage such that the second electrode is at a cathodic potential relative to the first electrode. In preferred embodiments, the apparatus can apply any or all of the various preferred reaction conditions described above, including the magnitudes and application times of the voltages, the electrolyte compositions and temperatures and the graphite electrode compositions. In a further preferred embodiment, the apparatus comprises a reference electrode and the power supply is controllable in response to a potential or potentials measured with respect to the reference electrode.

As noted above, in the prior art it has been proposed that the mechanism for electrolytic production of carbon nanotubes involves the intercalation of cations from the electrolyte into a graphite cathode. Although the details of the mechanism are not understood, and therefore should not be taken to limit the present invention, the inventors believe that the preferred aspects of the invention described above may correspond to an optimisation or enhancement of the intercalation rate of the alkali metal cations into the graphite cathode, which enables the formation of an increased amount or yield of carbon nanotubes.

The inventors' investigations have thus lead to the following observations.

Preferably, lithium chloride should be used as the electrolyte for carbon nanotube production. In the prior art, sodium chloride was considered to be the favoured electrolyte but the inventors have found that higher yields may be obtained by using lithium chloride.

In their investigations, the inventors focussed primarily on three forms of graphite, termed EC4, EC15 and EC17, all provided by the supplier Graphite Technologies. The specifications as given by the supplier are summarised below.

| Material | Density [g/cm$^3$] | Average grain size [μm] |
|---|---|---|
| EC4 | 1.75 | 38 |
| EC15 | 1.80 | 5 |
| EC17 | 1.90 | 1 |

EC4 is a soft, low-density graphite material composed of comparatively large graphite flakes. It was found to provide clearly superior nanotube yields under all experimental conditions investigated. Thus, it is proposed that soft or low-density graphite is preferable in any electrolytic production of carbon nanotubes.

In the inventors' experiments, the use of a three-terminal cell incorporating a reference electrode was found to be particularly advantageous. Since this permits the control of the cathode potential and/or cathode current density within the preferred ranges described above, it is thought that it may allow the cation intercalation rate to be maintained within a preferred range. This addresses a particular problem in the prior art which arises because the graphite cathode is gradually consumed, and so the specific surface area of the cathode changes. In conventional apparatus, this has made it impossible to maintain a controlled cathode potential or current density over substantial periods of time. In the inventors' investigations, they have analysed product quality as a function of time in such prior art apparatus, and it has been found that the selectivity of the process with respect to carbon nanotube formation decreases over time, typically after only a few minutes of operation. The invention may thus advantageously overcome this problem.

In addition, the inventors have observed that when a voltage is applied to a graphite cathode, and particularly when a relatively high voltage is applied, a spontaneous and rapid drop of the current flowing through the cell may occur after several minutes of operation. The inventors tentatively ascribe this observation to the formation of a continuous and poorly-wetting alkali-metal film around the cathode which affects further intercalation. Under these conditions, the formation of carbon nanotubes decelerates severely or ceases totally. The aspects of the invention described above may advantageously overcome this problem.

In a particularly-preferred embodiment, two graphite electrodes function alternately as the cathode and the anode, as described above. This embodiment may advantageously be applied in a two-terminal cell or a three-terminal electrochemical cell. In this approach, the current or the voltage are alternately switched between two graphite electrodes of preferentially similar geometry, such that each electrode is alternately applied as the cathode and the anode. Polarity is switched between predetermined values of current or voltage (for example corresponding to desired levels of cathode current density and/or cathode potential). Polarity is switched after predetermined intervals. The time intervals range favourably from 0.5 to 5 minutes, and the duration of the individual intervals may vary in the course of the process. Instead of switching the current or the voltage abruptly between the predetermined values, a current ramp or a voltage ramp may be applied so as to achieve a more continuous change. It is anticipated that the time required for changing of the polarity should be shorter than the time during which the predetermined currents or voltages are applied. Instead of applying constant currents or voltages during the individual intervals, either or both quantities may be modulated. By following the switching procedure, it may be possible to consume the graphite material exposed to the salt melt virtually completely, and without either significantly compromising the quality of the carbonaceous product or causing premature stoppage of the process.

In a particularly-preferred embodiment the various aspects of the invention described above may be combined, to provide a method or apparatus in which a graphite cathode is used in a molten salt electrolyte comprising lithium chloride, at a temperature within the preferred ranges described above, and the values of the (optionally modulated) current density and electrode potential remain substantially within the aforementioned ranges. These parameters may advantageously be controlled through the use of a reference electrode as described above. In a further preferred embodiment two graphite electrodes may be used and the potential-switching method applied. In the inventors' experiments, the combination of the various aspects of the invention has led to the total or near-total consumption of two EC4 graphite electrodes (the portions of the electrodes exposed to the electrolyte) and maximum selectivities, or yields, of 70% to 80% of the carbon material produced being carbon nanotubes.

Although this particularly-preferred embodiment produces highly advantageous results, the individual application of the various aspects of the invention may also advantageously enhance the performance of substantially any electrolytic cell for the fabrication of nano-scale carbon products including, for example, cells using sodium chloride or other electrolytes, or operating in different temperature ranges, or using other graphite electrode materials.

In the prior art, organic-solvent extraction has typically been used to recover the carbonaceous reaction product. However, the inventors have found that it is preferable to use vacuum-assisted filtering of the product out of the aqueous phase (following dissolution of the electrolyte in water) through a glass frit or filter paper. In this way, the use of organic solvents may be entirely avoided, and this is likely to be a particular advantage when handling large quantities of product.

DESCRIPTION OF SPECIFIC EMBODIMENTS AND BEST MODE OF THE INVENTION

Specific embodiments of the invention will now be described by way of example, with reference to the accompanying drawings, in which:

Figure 1:
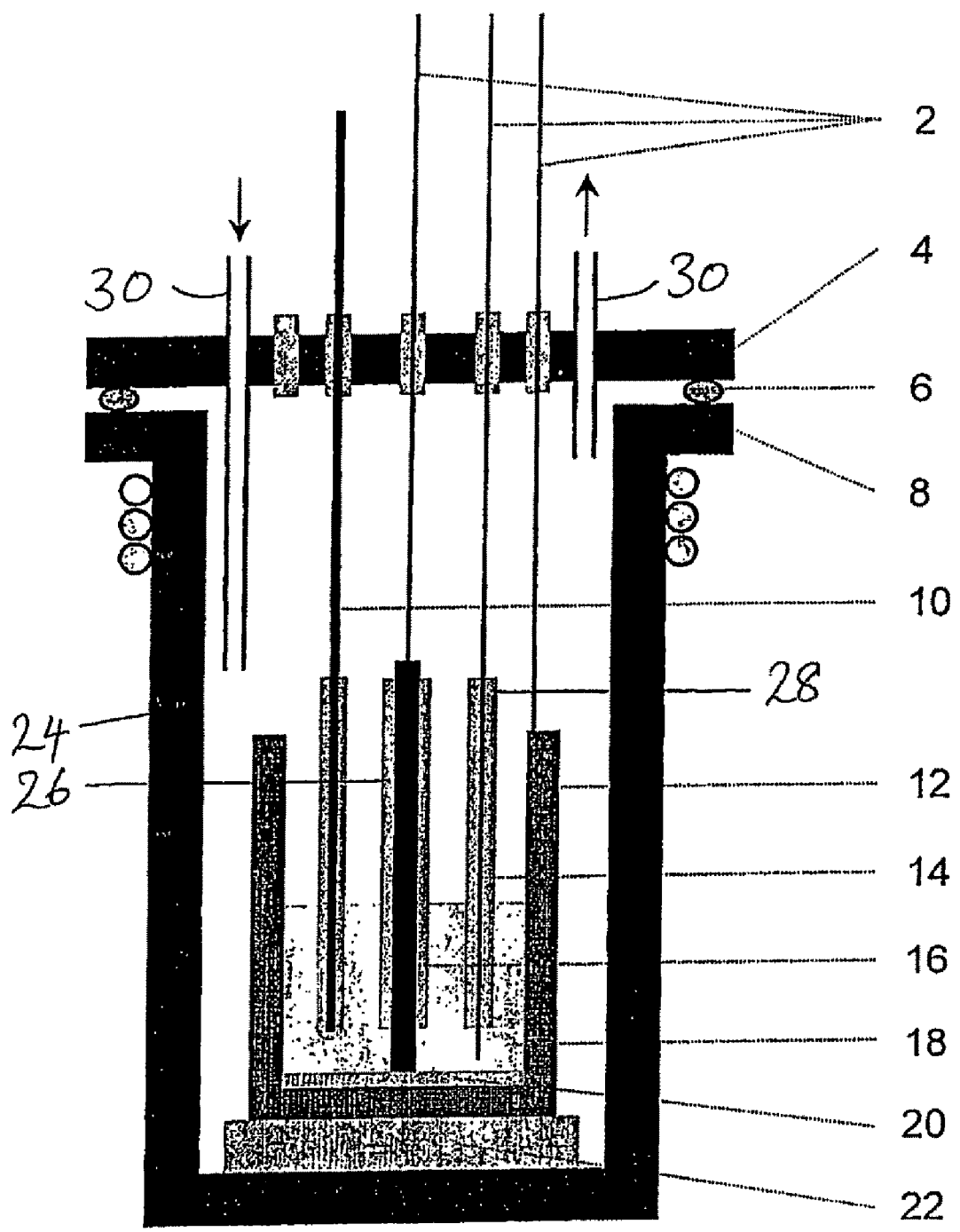
FIG. 1 is a cross-section of a three-terminal cell embodying the invention.

An apparatus according to a first embodiment of the invention is shown in FIG. 1 and comprises a vertical tubular reactor 24, either made from Inconel® or stainless steel, which can be positioned inside a programmable furnace. An upper end of the reactor 8 is closed with a stainless steel cover 4 sealed with an O-ring 6. The cover is equipped with feedthroughs for electrode leads 2 and a thermocouple 10 as well as with steel pipes 30 for gas inlet and gas outlet. The interior of the reactor is continuously purged with argon, the latter dried over self-indicating calcium sulphate. Current or voltage is applied through either a manually-controlled power supply (LS 30 10, Wayne Kerr) or a computer-controlled potentiostat (Powerstat, Sycopel Scientific). Switching of the applied voltage can be carried out either manually or by means of a suitably-programmed controller.

The reactor contains an electrochemical cell consisting of the following components. A graphite or alumina crucible 12 of approximately 10 to 14 cm of height and 5 to 7 cm of inner diameter was used as the salt (electrolyte) container. The container is filled with typically 200 g of nominally anhydrous lithium chloride (Aldrich 21, 323-3) 18. The salt is heated under an argon stream with a typical ramp rate of 150 C/h to the desired target temperature. The following electrodes are applied depending on the particular cell configuration required. In some cases, the graphite crucible may serve as the anode, and a graphite round bar 16 of 6.5 or 8.0 mm in diameter (e.g. EC4, Graphite Technologies) is used as the cathode. In other cases, the apparatus of FIG. 1 is modified to incorporate two graphite rods 50, 52 as the electrodes in an alumina crucible, as illustrated schematically in FIG. 4. The surface area of a graphite rod electrode exposed to the molten salt is approximately 2.5 cm$^2$ in each case. This is achieved through a tubular alumina sheath 26, which covers an upper part of the graphite rod such that only the lower part of the rod is in contact with the melt. If the crucible is used as an electrode, the lower end of the graphite rod electrode is positioned on an alumina tile 20 so as to avoid a short circuit between the electrodes, and the crucible is placed on an alumina tile 22 for electrical insulation from the reactor. If an alumina crucible is used, the graphite rod electrodes can be placed directly on the base of the crucible. The electrodes are connected to nickel wire of 2 mm in diameter using appropriately-threaded stainless-steel connectors (an externally-threaded end of a graphite-rod electrode is screwed into a threaded bore at one end of a stainless-steel connector, and the nickel wire is threaded into the other end of the connector). A pseudo-reference electrode 14 is constructed by feeding a molybdenum wire of 0.5 mm in diameter through an alumina sheath 28, such that a few centimetres of wire protrude from the lower end of the sheath. The exposed part of the wire is then twisted into a narrow spiral and put in contact with the salt melt. In a typical experiment, the graphite-rod electrode or electrodes are positioned inside the crucible before melting the salt; and the molybdenum pseudo-reference electrode, if used, is introduced after salt melting in order to avoid unnecessary corrosion. Electrochemical processing is typically started about 30 minutes after thermal equilibration has taken place.

Three different types of electrochemical processes can be performed using the apparatus described above.

Constant current method. Two electrodes are used, a graphite rod as the cathode and the graphite crucible as the anode. (In an alternative apparatus an inert anode or a graphite-rod anode could be used rather than the crucible.) In different experiments carried out on this basis by the inventors, the temperature was varied from 625 to above 1200 C, the initial current density was varied between 1.0 and 5.0 A/cm$^2$, and the time of operation was varied between 1 and 60 minutes.

Constant electrode-potential method. Three electrodes are used, a graphite rod as the cathode, the graphite crucible as the anode (or an inert anode or a graphite-rod anode), and a molybdenum wire as the pseudo-reference electrode. In different experiments carried out on this basis by the inventors, the temperature was varied between 700 and 820 C, the cathodic potential was varied between −1.5 and −3.0 V, and the time of operation was 6 minutes.

Figure 4:
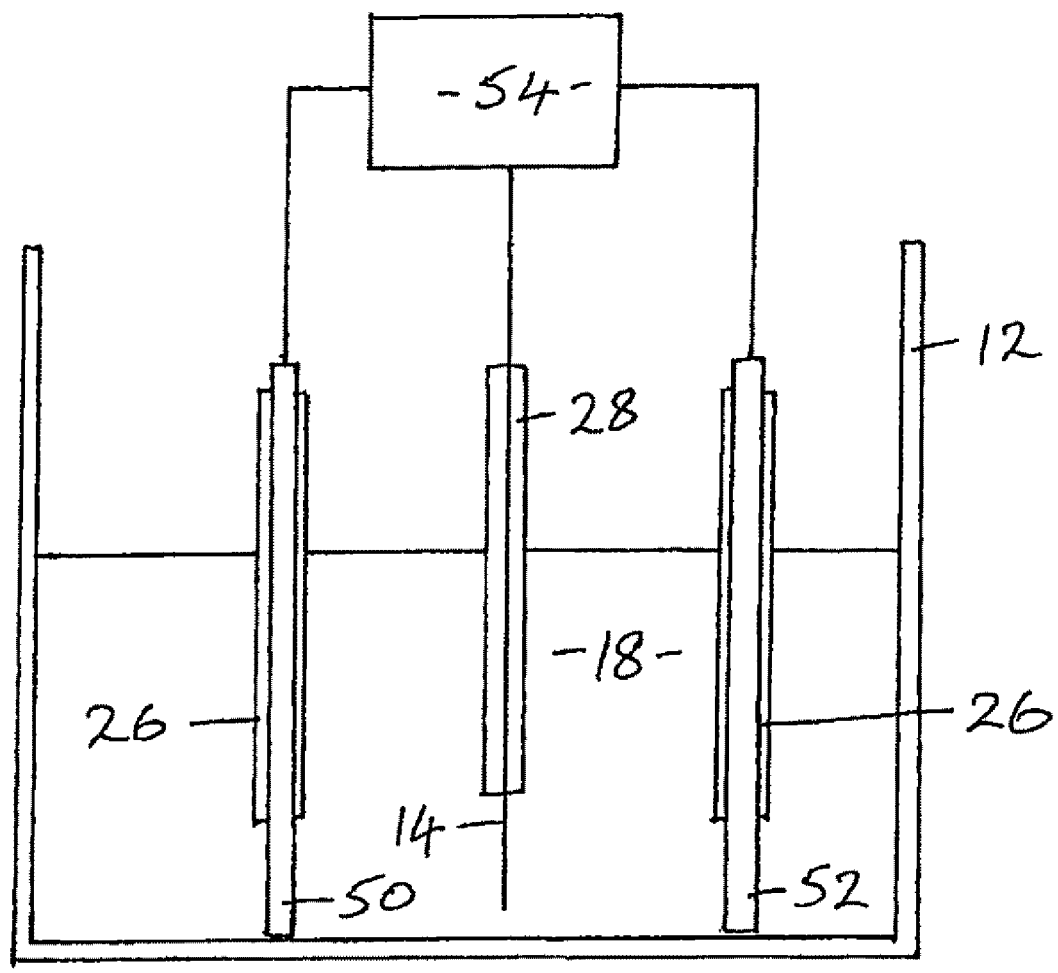
FIG. 4 is a schematic diagram of a three-terminal cell embodying the potential-switching aspect of the invention.

Switching electrode-potential method. In this embodiment, three electrodes are used, two graphite-rod electrodes 50, 52 (as illustrated in FIG. 4) for alternate application as the cathode and as the anode, and a molybdenum wire as the pseudo-reference electrode. The three electrodes are coupled to a power supply 54. Advantageously, the temperature is 780 C, and the cathodic potential is −2.5 V (measured relative to the pseudo-reference electrode) in each interval of polarisation (i.e. in each half-cycle), and the switching time (half-cycle duration) is 1 minute. The voltage switching between half-cycles in the embodiment is abrupt, so as to produce an applied potential between the electrodes in approximately the form of a square wave, but a slower voltage switch between half-cycles, in the form of a voltage ramp of predetermined gradient, may also be used. The experiment can be continued until the current drops to a low level, indicating complete consumption of the graphite provided.

In each case, when an electrolysis process is complete, the cell is cooled. After cooling, the solidified salt is washed out of the alumina crucible with tap water, and the carbonaceous reaction product recovered by way of vacuum-assisted filtering using a conventional glass frit or filter paper. In the inventors' experiments, the retrieved material was rinsed extensively with distilled water and then dried in ambient air at around 100 C. This procedure was found to be much simpler and faster than the prior-art solvent-extraction technique.

In each type of process, the graphite electrode or electrodes to be consumed is or are advantageously of a soft, low-density graphite. In the inventors' experiments, electrodes of EC4, EC15 and EC17 graphite (supplied by Graphite Technologies) were tested and the best results were obtained with EC4 graphite. The results described below are for EC4 graphite electrodes.

Figure 2:
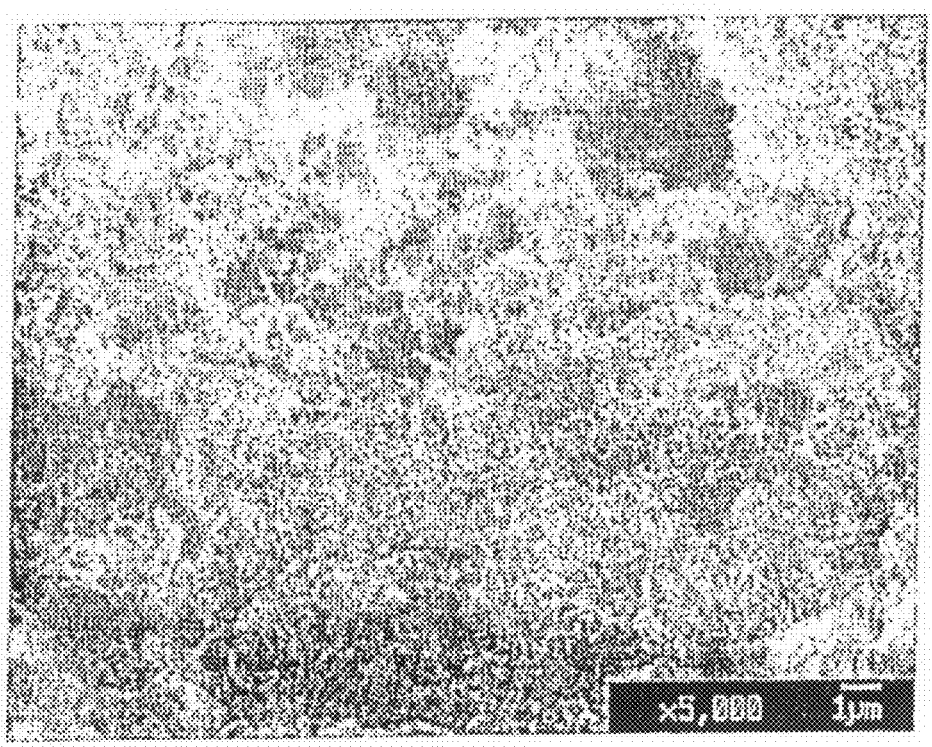
FIGS. 2 and 3 are scanning electron micrographs showing typical products of a preferred embodiment of the invention.
Figure 3:

The carbonaceous products in the inventors' experiments were investigated by means of scanning electron microscopy. With no other analysis technique available, and in line with all foregoing studies, the composition of the specimens was assessed through visual inspection. For constant-current experiments, it was found that a temperature of 770 to 780 C, an initial current density of approximately 2.0 A/cm$^2$, and a processing time of 6 to 8 minutes provided the optimum product, with up to 60% of the nanomaterial produced being tubes. For constant-electrode-potential experiments, the same temperature and a cathodic potential of approximately −2.5 V relative to the molybdenum pseudo-reference electrode were found to provide the best product, with about 70 to 80% of the nanomaterial produced being tubes. When using the potential-switching method, the quality of the product remained at this level, but the great advantage was now that the process could be continued until larger graphite electrodes were entirely consumed. FIGS. 2 and 3 present typical scanning electron micrographs and illustrate that, by following the above procedure, agglomerates of carbonaceous material may be prepared that contain large amounts of virtually-pure carbon nanotubes. A small portion of the material appears to be fibrous rather than tubular in nature, whilst carbon nanoparticles as well as other nanostructures are vastly absent. Overall, the quality of the carbonaceous material synthesised is unprecedented as far as the molten-salt electrochemical preparation technique is concerned.

The invention claimed is:

1. A method for producing nano-scale carbon products, comprising the steps of:

contacting a fused-salt electrolyte with first and second graphite electrodes; simultaneously; and alternately performing steps (A) and (B) in multiple repetitions as follows, so that each electrode is alternately applied as a cathode and an anode;

(A) applying to the electrodes for at least 30 seconds a first voltage such that the first electrode is at a cathodic potential relative to the second electrode, the first voltage generating a predetermined cathode current density at the first electrode of between 1.5 A·cm$^{-2}$ and 2.5 A·cm$^{-2}$; and (B) applying to the electrodes for at least 30 seconds a second voltage such that the second electrode is at a cathodic potential relative to the first electrode, the second voltage generating a predetermined cathode current density at the second electrode of between 1.5 A·cm$^{-2}$ and 2.5 A·cm$^{-2}$.

2. A method according to claim 1, in which the first and second voltages are of substantially equal magnitude.

3. A method according to claim 1, in which the first and second voltages are applied alternately within half-cycles of between about 30 seconds and 5 minutes.

4. A method according to claim 1, in which the first and second voltages are controlled with reference to a potential at a reference electrode in contact with the electrolyte.

5. A method according to claim 1, in which the first and second voltages generate cathodic potentials, at the first and second electrodes respectively, of between about 2.0 V and 3.0 V as measured with reference to a molybdenum pseudo-reference electrode in contact with the electrolyte.

6. A method according to claim 5, in which the first and second voltages generate cathodic potentials, at the first and second electrodes respectively, of about 2.5 V as measured with reference to the molybdenum pseudo-reference electrode.

7. A method according to claim 1, in which the fused-salt electrolyte comprises a halide of an alkali metal.

8. A method according to claim 1, in which the electrolyte temperature is between about 620 C and 700 C.

9. A method according to claim 1, in which the electrolyte temperature is between about 750 C and 800 C.

10. A method according to claim 1, in which the graphite electrodes comprise graphite having a density less than 1.8 $g \cdot cm^{-3}$.

11. A method according to claim 1, in which the graphite electrodes comprise graphite having an average grain size greater than 5 micrometers.

12. A method according to claim 1, in which a time taken to switch between the first voltage and the second voltage is less than a time for which the second voltage is applied in step (B), and a time taken to switch between the second voltage and the first voltage is less than a time for which the first voltage is applied in step (A).

* * * * *